Figure 1:
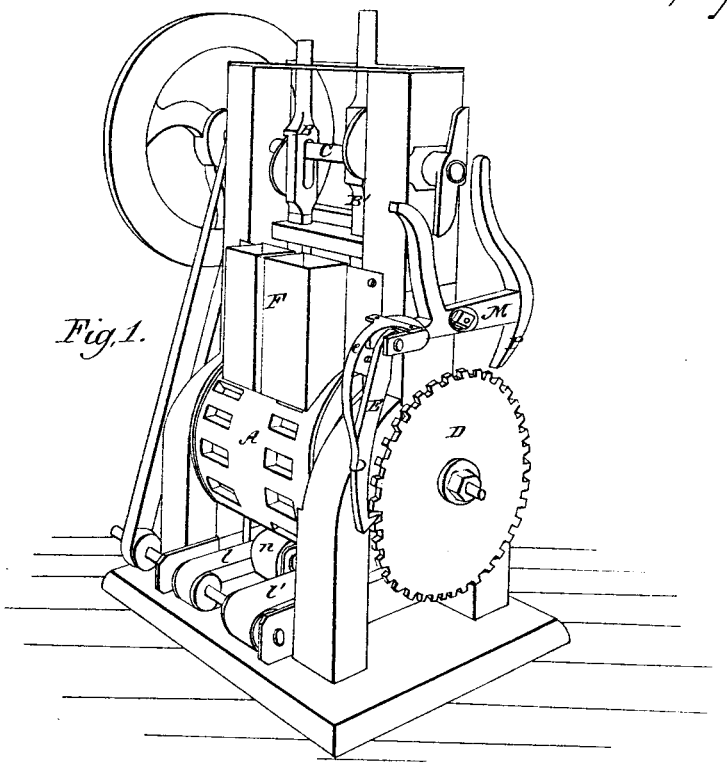
Figure 2:
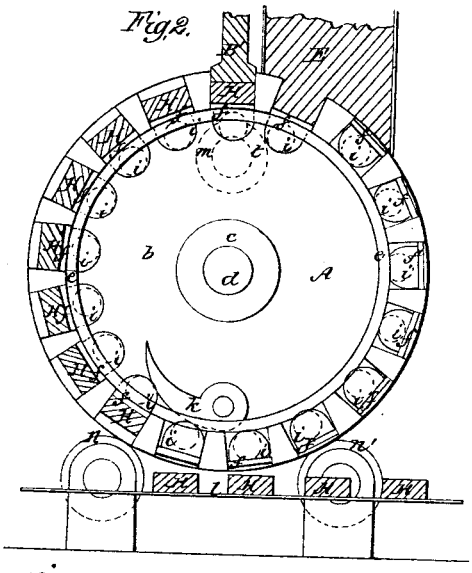
Figure 3:
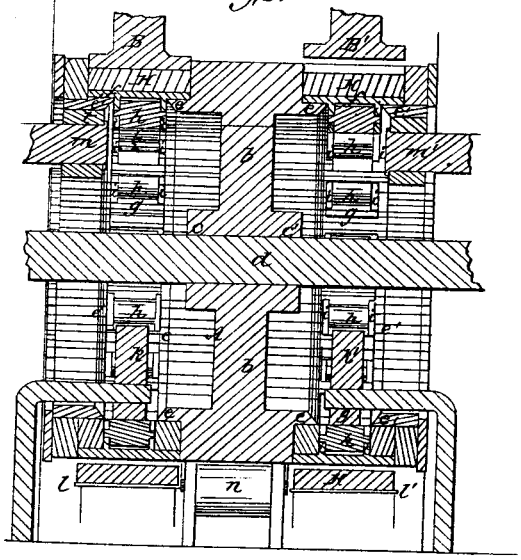

G. Crangle,

Brick Machine

No. 151.

A.1. Patented Sep. 9, 1856.

Witnesses. Chas. Merrian
Mo B. Kenney.

Inventor.
George Crangle.

AM. PHOTO-LITHO. CO. N.Y. (OSBORNE'S PROCESS)

DEPARTMENT OF COMMERCE
UNITED STATES PATENT AND TRADEMARK OFFICE

---

MISSING PAGE(S)

PATENT NUMBER AI 151 FOR THE ISSUE DATE 09/09/1856 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text / Claims